United States Patent Office 3,401,358
Patented Sept. 10, 1968

3,401,358
SIGNAL CONVERTER HAVING BIPOLAR
DETECTOR AND FEEDBACK CIRCUITS
Teddy G. Saunders, San Francisco, Calif., assignor to
Hewlett-Packard Company, Palo Alto, Calif., a corporation of California
Filed Oct. 23, 1965, Ser. No. 503,437
4 Claims. (Cl. 332—12)

ABSTRACT OF THE DISCLOSURE

A voltage-to-frequency converter includes a bipolar level detector and a bipolar feedback pulse circuit for operation on input signals of either polarity, thereby obviating the need for conventional polarity inverting amplifiers at the input of the converter or for separate pulse feedback circuits each responsive only to a signal at one polarity.

---

Accordingly, it is an object of the present invention to provide an improved voltage-to-frequency converter which produces an output having a repetition frequency related to the amplitude of applied voltages of either polarity.

It is another object of the present invention to provide a bipolar level detector and bipolar, constant-area pulse feedback circuit for a voltage-to-frequency converter.

In accordance with the illustrated embodiment of the present invention, the output of an integrator circuit which receives a signal to be converted is applied to a pair of level detectors which produce a pair of outputs that are initially in polarity opposition as the integrator output increases in amplitude from zero level. At the instant the integrator output attains a selected absolute value, the output of one of the level detectors reverses polarity. This polarity reversal causes a reversal of current direction through the primary winding of a saturable transformer which, in turn, provides feedback pulses of constant area and opposite polarity across each portion of the center-tapped secondary winding of the transformer. Switching means responsive to the polarity of the output of the other of the level detectors following the polarity reversal of said one level detector applies the feedback pulse of proper polarity from one portion of the secondary winding to the input of the integrator. This removes a fixed amount of charge from the integrator capacitor which thus causes the integrator output to decrease rapidly toward zero level, thereby resetting the outputs of the level detectors. The output of the integrator again increases in amplitude and the process repeats to produce at the output of the integrator a sawtooth waveform having a repetition frequency which is related to the absolute value of the input signal.

Figure 1:
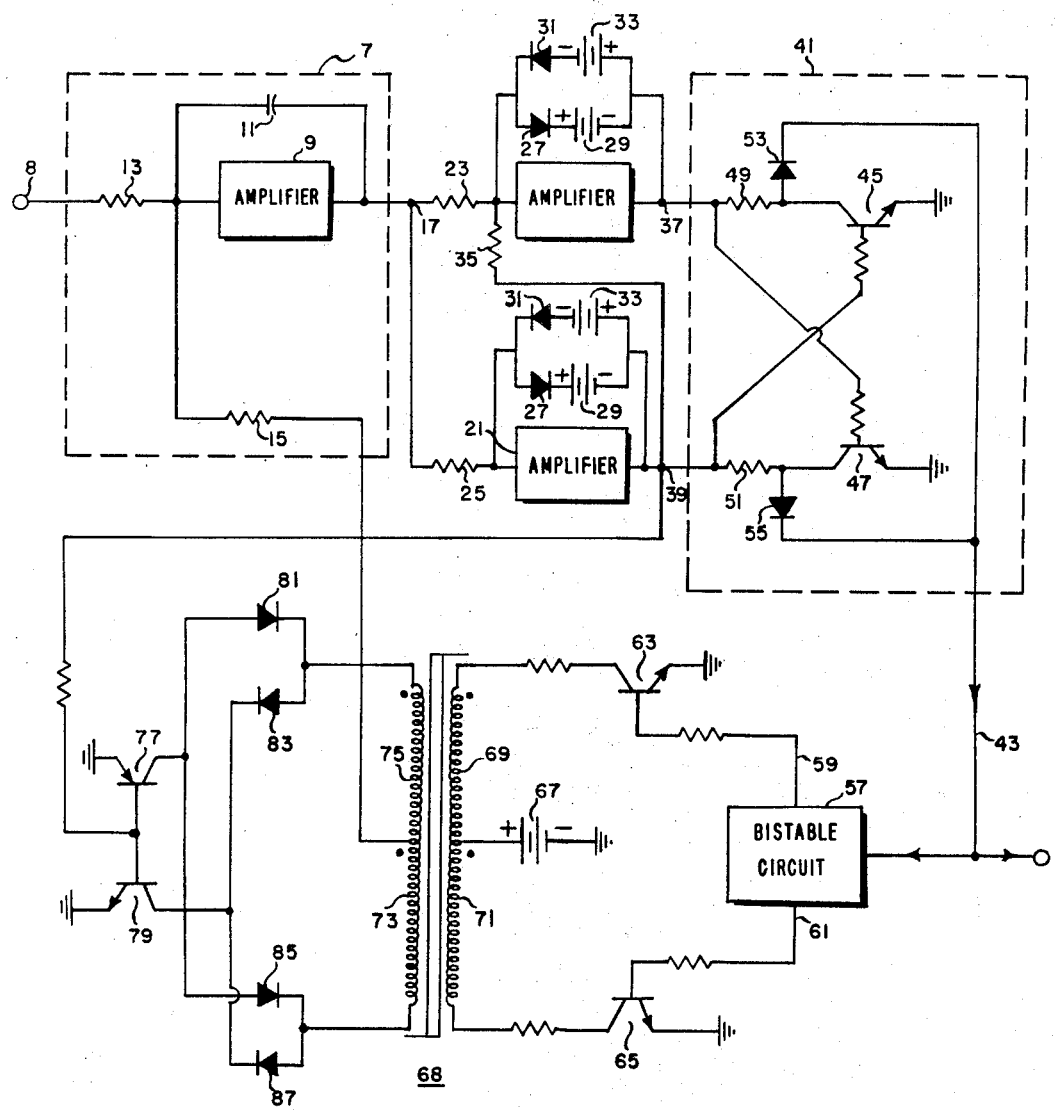
Figure 2:
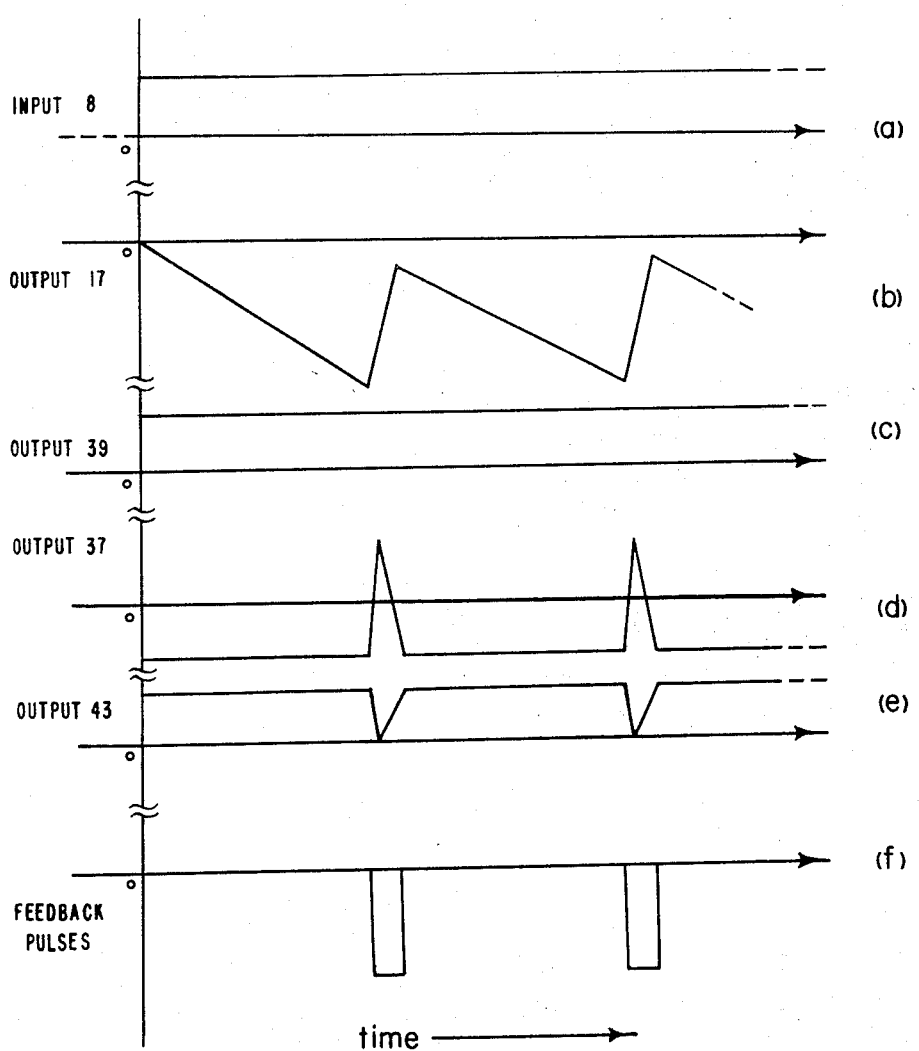

Other and incidental objects of the present invention will be apparent from a reading of this specification and an inspection of the accompanying drawing in which:

FIGURE 1 is a schematic diagram of the signal converter circuit according to one embodiment of the present invention; and FIGURE 2 is a graph showing various waveforms at selected points in the circuit of FIGURE 1.

Referring now to FIGURES 1 and 2, there is shown a conventional integrator 7 including an operational amplifier 9 which is shunted by a capacitor 11 and which is connected to receive an input signal through resistor 13 and a feedback signal through resistor 15. The output 17 of the integrator 7 is applied through resistors 23, 25 to the inputs of a pair of phase-inverting amplifiers 19, 21. Each of the amplifiers 19, 21 is shunted by a network including serially-connected diode 27 and voltage source 29 in shunt with serially-connected diode 31 and voltage source 33 where the diodes 27, 31 and voltage sources 29, 33 are oppositely poled and the voltage sources are of equal amplitude (with equal equivalent source resistances, in practice). The amplifiers 19 and 21 with the shunt networks operate as zero level detectors which produce signal voltages at the amplifier outputs equal in amplitude to the amplitude of the voltage sources 29, 33 and opposite in polarity to the polarity of the applied signal. Thus, for a signal applied to input terminal 8, say, a positive 1 volt step as shown in FIGURE 2a, the output 17 increases negatively with time, as shown in FIGURE 2b, at a rate which is determined by the values of resistor 13 and capacitor 11. At the instant this output attains a value greater than zero, each of the zero level detectors tends to produce a positive output at terminals 37, 39 equal to the value of the voltage sources 29, 33. However, the current resulting from the positive output of amplifier 21 applied to the input of amplifier 19 through resistor 35 is much larger than the current resulting from the initial non-zero and negative output 17 applied to the input of amplifier 19 through resistor 23. This causes the zero level detector including amplifier 19 to produce a negative output having a value equal to the voltage sources 29, 33 immediately following application of the signal to input terminal 8. The outputs at terminals 37, 39 thus remain equal in amplitude (i.e. equal to the value of voltage sources 29, 33) and opposite in polarity, as shown in FIGURES 2c and 2d, until the current supplied by the output 17 through resistor 23 attains a value which exceeds the value of current supplied by output 39 through resistor 35. At that instant, the output 37 reverses polarity so that both outputs 37, 39 are equal in amplitude and of the same polarity. It should be apparent from this description of the operation of the circuit on a positive input voltage that the operation of the circuit on a negative input voltage will be substantially the same with the exception that output 17 will be a positive-going ramp, output 39 will be negative and output 37 will be positive initially and will reverse polarity at a selected level of output 17.

Logic circuit 41 is connected to receive the two outputs 37, 39 and is adapted to produce a positive output 43, as shown in FIGURE 2e, when outputs 37, 39 are of opposite polarity and a zero output 43 when outputs 37, 39 are of the same polarity. To accomplish this, similar conductivity-type transistors 45, 47 are connected in the common emitter configuration with their collectors connected through load resistors 49, 51 to the outputs 37, 39. The base electrodes are cross coupled to the outputs 37, 39 and the collectors are connected to the output 43 by diodes 53, 55 which are both poled to pass positive signals. Thus for outputs 37, 39 of opposite polarity, one of the transistors is non conductive, thereby permitting the positive one of ouputs 37, 39 to pass through one of diodes 53, 55. For outputs 37, 39 of the same polarity, no signal is passed by either diode so that output 43 drops momentarily toward zero value.

Bistable circuit 57 produces control signals at outputs 59, 61 in response to the output 43 applied thereto changing from a positive value toward zero value. A pair of transistor switches 63, 65 are normally biased by bistable circuit 57 to conduct current from source 67 more heavily through one portion, say 69, of the primary winding of saturable transformer 68 than through the other portion 71. Thus, the control signal on outputs 59, 61 when applied to these transistor switches cause the current to flow more heavily in the other of the two portions 69, 71 of the primary winding. This produces a voltage on the two portions 73, 75 of the secondary winding for the duration of flux change in the transformer 68. The output 39 which has the same polarity as the signal applied to input terminal 8 is applied to the complementary conductivity-type transistor switches to render one of them conductive. The conductive switch together with diodes 81–87 select the voltage of proper polarity appearing across one of the portions 73, 75 of the secondary winding to be applied through resistor 15 to the input of integrator 7 as a feedback pulse as shown in FIGURE 2f. Thus, for a positive signal applied to terminal 8, a feedback pulse of opposite or negative polarity and known volt-second pulse area is applied to integrator 7 to remove a known amount of charge from integrating capacitor 11. This causes the output 17 to decrease rapidly, as shown in FIGURE 2b, to a smaller value from which the output 17 again increases with time. This causes the zero level detectors to produce outputs of opposite polarity in a manner as previously described, which in turn, causes logic circuit 41 to produce a positive output at 43. The output 43 actuates bistable circuit 57 to restore the transistor switches 63, 65 to the normal conductivity condition which allows current to flow through one of the portions 69, 71 of the primary winding of transformers 68. The operation continues in this manner to produce a sawtooth wave at output 17 as long as a signal is present on terminal 8. As the amplitude of the input increases, the repetition rate of the feedback pulses increases such that the feedback pulse average over the period of such pulses remains equal to the amplitude of the signal applied to terminal 8. The repetition rate of pulses at output 43 is thus related to the magnitude of the input signal independent of its polarity.

I claim:
1. Signal converter apparatus comprising:
an integrator having an input connected for receiving an applied signal and having an output;
detector means connected to receive the output of said integrator for producing a pair of control signals in two polarity states, one polarity state including the control signals of opposite polarity for values of the output of the integrator below a selected level and another polarity state including the control signals of the same polarity for the value of the output of the integrator attaining said selected level;
a transformer having a primary and a secondary winding;
a source of current for said primary winding;
circuit means connected to said detector means for receiving said control signals and responsive to said control signals in one of the polarity states for supplying current from said source to said primary winding for producing a flux in said transformer and responsive to the control signals in another of the polarity states for altering the current supplied to said primary winding from said source to produce a signal on said secondary winding; and
switching means connected to said transformer and to said detector means and responsive to the polarity of one of said control signals for applying the signal on said secondary winding to the input of said integrator in polarity opposition to the applied signal for reducing the output of the integrator by a fixed decrement.

2. Apparatus as in claim 1 wherein:
said detector means includes a pair of gain-inverting amplifiers, each having an input connected through a resistor to the output of said integrator and having an output to supply a control signal;
a network shunting each of said amplifiers and including a pair of shunt-connected series circuits, each of said series circuits including a voltage source and a diode connected in polarity opposition; and
a current path from the output of one of the amplifiers to the input of the other and said amplifiers.

3. Apparatus as in claim 1 wherein:
said transformer includes a saturable core, a center tapped primary winding on said core and a center-tapped secondary winding on said core; and
said circuit means includes switches in the end terminals of said primary winding for completing a current path from said source through a selected portion of the primary winding in response to a selected ones of said polarity states of the control signals.

4. Signal converter apparatus as in claim 1 comprising:
a logic circuit connected to receive said control signals for producing an output in response to a change in the polarity states of said control signals; and
said circuit means is responsive to the output of said logic circuit for normally supplying current from said source to said primary winding for producing a flux in said transformer and for altering the current supplied to said primary winding from said source to produce a signal on said secondary winding in response to the change of the polarity states of said control signals.

References Cited

UNITED STATES PATENTS 3,187,260 6/1965 Dove _____ 328—57
3,330,970 7/1967 Wennerberg et al. ____ 328—28

ROY LAKE, *Primary Examiner.*

L. J. DAHL, *Assistant Examiner.*